United States Patent
Berthomier et al.

(10) Patent No.: US 11,335,065 B2
(45) Date of Patent: May 17, 2022

(54) METHOD OF CONSTRUCTION OF A COMPUTER-GENERATED IMAGE AND A VIRTUAL ENVIRONMENT

(71) Applicant: DVDPERPLAY SA, Paris (FR)

(72) Inventors: Julien Berthomier, Paris (FR); Emmanuel Naxos, Epinay sur Orge (FR)

(73) Assignee: DIAKSE, Paris (FR)

(*) Notice: Subject to any disclaimer, the term of this patent is extended or adjusted under 35 U.S.C. 154(b) by 0 days.

(21) Appl. No.: 16/770,470

(22) PCT Filed: Dec. 5, 2018

(86) PCT No.: PCT/IB2018/059656
§ 371 (c)(1),
(2) Date: Jun. 5, 2020

(87) PCT Pub. No.: WO2019/111167
PCT Pub. Date: Jun. 13, 2019

(65) Prior Publication Data
US 2020/0312034 A1 Oct. 1, 2020

Related U.S. Application Data

(60) Provisional application No. 62/595,006, filed on Dec. 5, 2017.

(51) Int. Cl.
*G06T 19/00* (2011.01)
*G06T 19/20* (2011.01)

(52) U.S. Cl.
CPC ............ *G06T 19/006* (2013.01); *G06T 19/20* (2013.01); *G06T 2200/24* (2013.01); *G06T 2219/2021* (2013.01)

(58) Field of Classification Search
None
See application file for complete search history.

(56) References Cited

U.S. PATENT DOCUMENTS

6,400,362 B1 * 6/2002 Uchiyama ............... G06T 15/00
345/420
9,865,069 B1 * 1/2018 Saporta ..................... G06T 3/40
(Continued)

*Primary Examiner* — Ryan M Gray
(74) *Attorney, Agent, or Firm* — Womble Bond Dickinson (US) LLP (57) ABSTRACT

A method of construction of a computer-generated image, the computer-generated image comprising a representation of an environment, called setting image, from a point of view, and at least one location of the setting for insertion of an image of an object, comprises:
a step of creating of a setting image applying the laws of perspective,
a step of generating at least one rendered or captured image of at least one object, the representation of the object in each image obeying the laws of perspective so during the generation of the object image,
the generating step being independent from the creating step,
a step of incorporation of the object image into at least one location of the setting image, wherein the application of the laws of perspective on the object image creates an error, discernible to the human eye, with the law of perspective applied in the point of view, whereby the constructed computer-generated image presents an overall perceived photorealism.

16 Claims, 3 Drawing Sheets

(56) References Cited

U.S. PATENT DOCUMENTS

| | | | |
|---|---|---|---|
| 2002/0113791 A1* | 8/2002 | Li | G06T 15/20 345/427 |
| 2003/0179218 A1* | 9/2003 | Martins | G06T 19/00 345/633 |
| 2004/0223190 A1* | 11/2004 | Oka | G06T 19/006 358/302 |
| 2009/0051682 A1* | 2/2009 | Lensing | G06T 15/00 345/419 |
| 2013/0141530 A1* | 6/2013 | Zavesky | G06T 19/20 348/43 |
| 2013/0162644 A1* | 6/2013 | Velkavrh | G06T 17/20 345/423 |
| 2014/0022243 A1* | 1/2014 | Loberg | G06F 9/451 345/419 |
| 2014/0125668 A1* | 5/2014 | Steed | G06T 15/50 345/426 |
| 2015/0381968 A1* | 12/2015 | Arora | G06T 17/00 348/47 |
| 2016/0275596 A1* | 9/2016 | Adeyoola | G06F 16/5854 |
| 2017/0011558 A1* | 1/2017 | Meier | G06T 7/70 |
| 2019/0156585 A1* | 5/2019 | Mott | G06T 19/20 |

* cited by examiner

METHOD OF CONSTRUCTION OF A COMPUTER-GENERATED IMAGE AND A VIRTUAL ENVIRONMENT

FIELD OF THE INVENTION

The present invention relates to a method of construction of computer-generated images and a virtual environment of computer-generated images constituted according to said method.

The present invention applies to the field of virtual environment creation and modification, and more particularly to the field of websites providing virtual shops, wherein objects are placed in virtual environments. Such websites can be designed to sell spaces such as apartments, housing, industrial and logistics sites, etc., or to sell products and objects inserted inside these environments. Examples are fashion websites, presentation of exhibitions, event promotion, real estate development staging or institutional sites.

More specifically, the invention relates to tools to construct virtual environments and adapt said environments as new objects are presented, inserted or removed.

The invention could also be applied to the media, for example for movies using realistic computer-generated images.

BACKGROUND OF THE INVENTION

To create virtual representations of real spaces and objects by computer-generated imaging, two methods exist: 3D-modelling and 360° photography, 3D modeling consists in creating spaces and objects by designing points, lines, surfaces and textures, and computing each possible view of such spaces and objects.

360° photography, also referred to as "360° panoramic images", refers to a photographic technique by which a series of individual photos are taken and assembled for each point of view inside a given space. It is also referred to as "360 product photography", "360 spin", "360 view", "Spin Photography" or "Product Spin", which consists in taking a series of photographs of an object rotating on one or on multiple axes to create multi-row 360 product photography.

3D modelling enables simple creation and modification of virtual spaces constituted of an assembly of virtual objects. The complication of 3D modelling comes from the photorealistic rendering, which is time-consuming and costly in terms of designing and computation. These drawbacks make this technique impossible to use for an Internet application without seriously degrading the image quality. Indeed, relatively low-speed internet access and/or low speed of mobile processors are not compatible with the need of complex computation. Furthermore, time spent on design makes this technique too costly for an e-commerce application.

As an alternative to 3D modeling, 360° photography allows for hyper realistic representations at a lower cost and with no complicated computation. However, there is no possibility with this technique either to modify the photographed space, or to semi-automatically integrate new objects, nor to move objects already integrated inside the photographed space.

Several solutions tried to circumvent these two problems (reducing computation and design costs of 3D modelling, or finding ways to insert objects inside different 360° points of view), but have never solved them fully. Some of these solutions are described in the lines below.

Nowadays, virtual locations like shops consist for example of digitalization of shelves. Avatars of retailer shelves are created, and products are added afterwards on the shelves. Products are then arranged within shelves, for which the characteristics are standardized and predetermined with simple parameters such as for example: the camera angle, the horizontality, the size of the shelve, the lighting. In such cases the positioning of virtual objects onto the shelves is a simple operation. The object can indeed be placed in any desired position with an adapted shadow, making the method of creating the virtual shop simple and easily reproducible. However, the creation of such shops from 3D modeling tools would not be realistic in the case movements were to be represented: the quality of such created images would not be photorealistic enough.

An example of such a method is described in patent application US 2014/222 627 A1. In said patent application, the problems indicated here are not solved, as there is no indication as to how objects are inserted into a 360° virtual shop. This patent application sets forth a method of representing shelves and inserting products in the shelves, which products a user can order with one click. However, this patent application merely reproduces standardized marketing situations such as those of department stores where the number of shelves is optimized in a predetermined volume. Such presentations do not adapt to the user profile, i.e. a desired store front should not be predetermined and standardized by definition, and the psychological impact on the user linked to the choice of the presentation of the selected products should better be considered.

A method exists aiming at generating orders for a real shop through its avatar. The method consists in creating 360 photography of shops with predetermined hotspots corresponding to stalls booked by the advertiser wherein products sold by the advertiser are then placed onto said stalls (i.e. shelves). A user, after selecting an object, is then redirected to the e-commerce website of the advertiser with a transmission of the designation of the selected object to directly display the photo corresponding to the object in the real shop of the advertiser. For the advertiser, the order and expedition of the object is direct and just-in-time. Virtual environments created from panoramas made in 360° of shops, events locations, shopping malls or residential areas for example, also exist. A user is invited to move virtually through the virtual environment as if he was moving with a camera on the shoulder. Objects are placed to create a psychological response from the user through various means that will use photorealism via imaging artefacts, so that these objects value to the user is enhanced. The most important drawbacks of virtual environments such as the ones described above is that a new series of panoramas is necessary each time one needs to modify or reposition one of the items; inevitably, these drawbacks increase quite significantly the undesired cost of a virtual environment.

360° Photography allows giving the impression of realism for a product, but this technique needs a continuous rotating movement and therefore does not answer the problem of representing static environments with products inside. 360° Photography makes it possible for website designers to get realistic photos of an object under any viewing angle. Usually, 360° panoramas are obtained via 90 to 180 successive frames taken every 2 to 4° along a vertical axis. This allows the user to then manipulate the virtual object through different spatial rotations with the illusion of a perfect continuity, due to the persistence effect of vision for a predetermined movement speed, such as the movement of a view point (e.g. representing a virtual visitor with a camera on a shoulder, moving around the virtual location). The effect of creating a continuity illusion with a virtual movement is obtained via an assembly of photographs, in which transitional images are created from initially captured images. But this technique has a major drawback when the visitor or the virtual object is not supposed to move: 360° photography cannot allow for such an illusion when three-dimensional objects are placed within a still environment.

3D Modeling allows to give the impression of realism for a product, but this technique needs huge computing and designing costs. 3D modeling consists in generating 3D modeled objects or merging captured images with 3D modeled objects. It is possible to create virtual objects using computer-aided design (CAD) and to make them photorealistic by modulating the density of light to create a 3D volume effect, as well as by changing the color or texture, by inserting various effects such as shadows and lighting depending on the observation point. The most fundamental aspect that is used to render optimal photorealism is inserting a "lightning conditions compatible" shadow of the object in a lit-up space; this key aspect is necessary because the non-uniform distribution of light through real space reveals the shape of objects to the human eye. Such renderings can be obtained with a coloring or imaging software, e.g. Photoshop (registered trademark). However, such renderings are computer-time and bandwidth consuming. The main problem that all 3D modeling programs try to solve is how to simulate and transcribe real objects with a continuous persistent fidelity to physical phenomena that are expected to occur to these real objects in the real world, such as geometry, gravity, optics and color. But such a need for consistency requires growing computing power and bandwidth, which is a heavy constraint that limits the creativity of virtual websites that aim at being dynamic, flexible and quickly adaptable in their content and in their design.

This problem is also well known by video game editing software. When a virtual player modifies the point of view inside his game, by going forward for example, the integrity of the scene must be recomputed which takes time and bandwidth. When there is insufficient available bandwidth, the whole image is degraded, for example by being pixelated, in other words the image will be formed of general blocks and lose all aspects of realism.

As demonstrated, all methods described above fail to find a way to create any sort of virtual environment that can be displayed on the web with photorealism and where objects can be inserted and removed easily. More specifically, a method needs to be found, which would allow for inserting collection of objects from a given database of objects into any virtual environment from a given database of environments, these objects being presented with photorealism as to create emotion for a typical user visiting the website.

There exist accessories to put in a photo, to determine attributes of an image and to match those attributes with attributes of a background. The state of art teaches that the creator of such environments should try to match attributes of an object that should be inserted into a given known point of view. This is therefore a strong limitation when the point of view and the considered object are not known simultaneously at the time of the image creation for each one of the object and the point of view.

SUMMARY OF THE INVENTION

The present invention aims at alleviating the drawbacks of the prior art. More specifically, the invention aims at giving the impression of photorealism for virtual environments and for virtual objects without fulfilling the need for a perfect real physics-compatible rendering of virtual images. The invention solves the problems of the prior art by giving an impression of photorealism on a scene (an environment) that is sufficient so that a regular user would not immediately notice the difference of this scene with an expected real view of an equivalent scene in the real world. To achieve this, the invention is based on perceived photorealism as opposed to physical photorealism. In perceived photorealism, the effects of physical properties are approximated in view of simplifying computation to give an overall impression of photorealism, in which flaws might be detected by one skilled in the computer visual and photographic arts, also known as a "golden eye", but not by an average user.

To this end, according to a first aspect, the invention provides a method of construction of a computer-generated image, the computer-generated image comprising a representation of an environment, called setting image, from a point of view, and at least one location of the setting for insertion of an image of an object, comprising:

a step of creating a setting image applying the laws of perspective, a step of generating at least one rendered or captured image of at least one object, the representation of the object in each image obeying the laws of perspective during the generation of the object image, the generating step being independent from the creating step, a step of incorporation of the object image into at least one location of the setting image, wherein the application of the laws of perspective on the object image creates an error, discernible to the human eye, with the law of perspective applied in the point of view, whereby the constructed computer-generated image presents an overall perceived photorealism.

Thanks to these provisions, it becomes possible to independently and separately create settings and representations of objects that will be later inserted in any possible settings. Thanks to these provisions there is a second benefit for the design of such virtual environments: It makes it possible to limit the number of images for each object to insert, compared to reproducing the exact laws of physics.

This method is the result of a choice not to follow laws of nature's real-world physics, such as geometry, gravity, optics and/or colorimetry, while generating the virtual environment composed of a virtual location and of one or several points of view and of several virtual objects, each on with a specific point of view, positioned within this virtual environment.

Hence, being freed from said physical laws of nature, unlike teachings of the state of the art, the method of the invention makes it possible to obtain perceived photorealism, by greatly optimizing the costs in time and in mobilization of computing power during the production of a rendering before posting it online. Therefore, the two following objectives are achieved:

simple, non-time-consuming insertion of an object in an environment by avoiding image editing; and possible dynamic insertion of a given object into a predefined environment.

Another advantage of the invention is its capacity to process non-closed volumes and environments such as buildings interiors and combinations of buildings and gardens, landscapes, or street-views, whereas, for example, known solutions of the state of the art cannot reconstruct photorealistic details of greenery and plants without mobilizing manpower, computer resources and time. The resources needed, using state of the art techniques, for the equivalent results as those of the method subject of the invention, are three to tenfold higher.

Another advantage of the invention is reducing the costs of creation and operational management of websites, when these sites promote strong relationships between products and brands. The method subject of the invention provides the possibility of dynamically insert products inside virtual environments that are related to brand image.

More specifically, for any virtual environment, during the recomputation of computer-generated images (for which the acronym is CGI) from one point of view to another, parts of the image will be maintained unchanged because the CGI of the point of view will still be perceived as photorealistic. Therefore, the computation time is minimized and there is no degrading of the general quality of the image, but merely some rules applying to the real world will not be respected without knowledge to the general user.

In a particular embodiment, the method subject of the invention furthermore comprises:
  a step of determining a percentage of a surface of the setting image in which at least one image of at least one object is inserted,
  a step of computing a number N of images of at least one object to capture, N depending on the percentage determined,
  a step of capturing and/or rendering N images of said at least one object,
  during the incorporation step, inserting one of the N images into the setting image.

In a particular embodiment, each capturing or rendering of an object image is defined by respective parameter values of one or several among:
  the geometrical dimensions of the object;
  the observation point;
  the angle of view;
  the lighting,
  and for each parameter, the parameter values of the N corresponding object images are distributed within a range.

In a particular embodiment, the percentage determined is related to one or several among:
  the geometrical dimensions of the object;
  the observation point;
  the angle of view; and/or
  the lighting.

In a particular embodiment, the number N is computed proportionally to the percentage determined.

In a particular embodiment, the method subject of the invention is applied to at least two different points of view of the environment, the method comprising the construction of a second computer-generated image for a second point of view, the second setting image created in the construction of the second computer-generated image partially comprising elements of the first setting image created in the construction of the first computer-generated image and said object image.

In a particular embodiment, the method subject of the invention comprises:
  a step of measuring an angular variation between an element common to the two setting images, and
  a step of comparing said angular variation with a predetermined angular variation value.

In a particular embodiment, the method subject of the invention furthermore comprises:
  constructing an initial computer-generated image from an initial point of view of the virtual environment by inserting at least one image of an object in the corresponding initial setting image, and
  constructing a subsequent computer-generated image from a subsequent point of view, and
  automatically inserting an object image positioned in the initial computer-generated image into the setting image created in the construction of the subsequent computer-generated image, depending on its position in the initial computer-generated image.

In a particular embodiment, during the construction of the subsequent computer-generated image, an image of each object to be inserted in the corresponding subsequent setting image is selected automatically, depending on a point of view of the image of the object and on a geometric variation between the initial computer-generated image and the subsequent computer-generated image.

In a particular embodiment, during the selection of an image of an object, the image selected corresponds to the minimum angular error in comparison with the change of point of view from an already constituted computer-generated image of a point of view.

In a particular embodiment, at least one optical parameter of the automatically selected object image is automatically adapted to the subsequent setting image.

In a particular embodiment, the automatic selection of an object image comprises the generation of a user interface for changing at least one optical or geometrical parameter of the object image and/or for scrolling through captured or rendered object images.

In a particular embodiment, the method subject of the invention comprises a step of generating a shadow of the representation of the object in the object image inserted into at least one setting image.

In a particular embodiment, the shadow is generated according to a predefined projection that is independent from the virtual environment.

According to a second aspect, the present invention provides a computer-generated image constructed according to a method as defined above.

According to a third aspect, the present invention provides a system adapted to implement a method as defined above.

BRIEF DESCRIPTION OF THE DRAWINGS

Other advantages, aims and particular features of the invention will become apparent from the non-limiting description that follows of at least one particular embodiment of the method and of the virtual environment that are the subjects of the present invention, with reference to drawings included in an appendix, wherein.

DETAILED DESCRIPTION OF EMBODIMENTS

The present description is given as a non-limiting example, each feature of an embodiment being able to be combined with any other feature of any other embodiment in an advantageous way. In addition, each parameter of an example of realization can be utilized independently from the other parameters of said example of realization.

It is now noted that the figures are not to scale.

The inventors have realized that, a user of a website, a video game, or any application of computer-generated images is focused on perceiving photorealism. The method subject of the present invention consists in obtaining perceived photorealism for an object represented in a point of view of a virtual environment.

The inventors have noticed that the best perceived photorealism can be obtained although the physical photorealism is not optimum. The invention differs from every other method for obtaining physical photorealism, where the photorealism of the rendering is improved by applying in the best possible way the laws of physics. The inventors noticed that sufficient perceived photorealism was obtained by simulating and approximating the laws of physics. More specifically, a better photorealism can be obtained by not meeting the laws of geometry while meeting a high rendering quality, i.e. a rendering close to pure photography, rather than by providing a low quality rendering, such as pixilation, and closely meeting the laws of physics.

Figure 1:
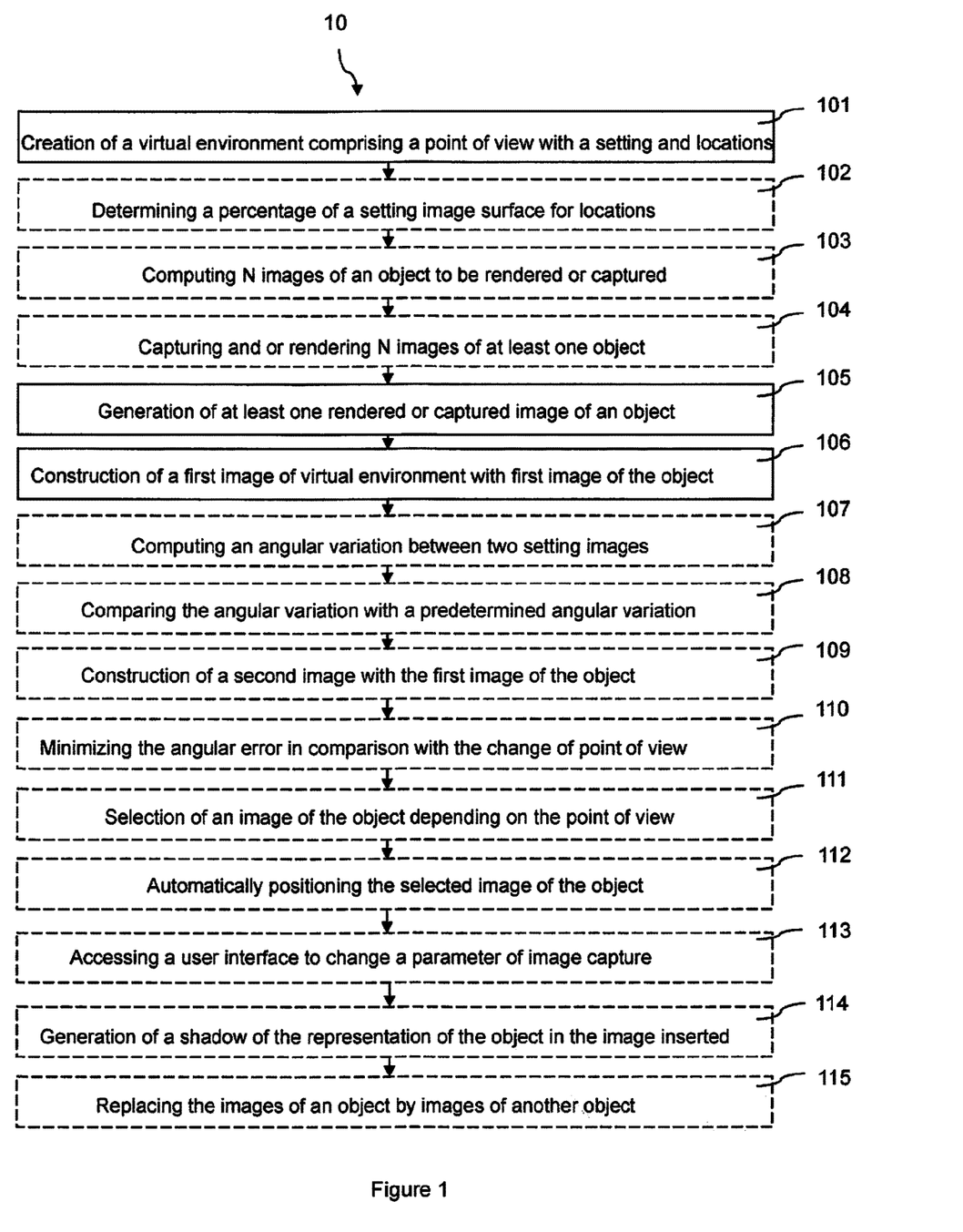
FIG. 1 represents, in the form of a logical diagram, steps in a particular embodiment of the method that is the subject of the present invention.

FIG. 1 represents a logic diagram of a particular embodiment of a method 10 of construction of computer-generated images. The steps within dotted lines are additional optional steps.

In the following description of FIGS. 1 to 3, reference will be made to a virtual shop as an example of a virtual environment. However, the invention is not limited to virtual shops.

The method 10 is a method of construction of a computer-generated image. The computer-generated image represents a virtual environment from a point of view. A virtual environment is a three-dimensional virtual space at least defined by a setting. A user can virtually move through a virtual environment from a point of view to another. A virtual environment can be defined as a three-dimensional representation of a setting within which users perceive themselves to be, and within which interactions take place. The points of view can be close to one another, such as in video games where the representation of the view of the user has to be able to reproduce the impression of movement, or virtually distant from one another. In the setting, at least one location for inserting an image is arbitrarily chosen. Hence, said location can be viewed by the user from different points of view of the virtual environment.

A virtual environment comprises a reference frame and distances and angles can be computed in the virtual environment. Hence, a distance, or an angle between different points of view can be computed. Moreover, the law of perspectives applies in a virtual environment so as to be perceived as photorealistic.

Hence, the setting from a point of view can be defined as a two-dimensional representation of the virtual environment from said point of view placed in said virtual environment. A point of view can be defined as a position from which a user is seeing a setting or a view in a virtual environment.

The method 10 comprises a step 101 of creating of a first point of view applying the laws of perspective. The step 101 of creating of a virtual environment can be carried out by any method known to one of ordinary skill in the art.

Preferentially, the virtual environment comprises at least two points of view.

A virtual environment is represented by a set of physical characteristics such as at least a geometry, a definition of weight for gravity, and optical or colorimetric characteristics. Each point of view of each virtual environment is stored in a database registering the physical characteristics of the virtual environment and the virtual positioning of the placement of the virtual camera, or eye, in the virtual environment. A virtual environment can comprise a virtual shop and virtual objects such as tables. Any other type of virtual environment can be used for the method 10 subject of the present invention.

Preferentially, for each representation of a virtual environment, a set of parameters can be stored in the database. The parameters are, for example:
  an average distance to a point of view;
  lighting conditions;
  an average colorimetry of the representations, and/or;
  an average angle with a virtual horizontal line from the point of view.

The method 10 comprises a step 105 of generating at least one rendered or captured first image of at least one object, the representation of the object in each image obeying the laws of perspective during the generation of the first image.

The object may be a virtual object. The virtual object consists of a set of physical characteristics which are at least a geometry, a definition of weight for gravity, and optical or colorimetric characteristics. The physical characteristics make it possible to create a shape with a texture similar to a shape and a texture of a real object. When the object is a virtual object, images are taken from the modelling of the object in order to have a two-dimensional representation of an object to place in the virtual environment. The images can be taken according to different points of view or different lighting conditions, for example.

When the object is a real object, the images can be photographs (pictures) of the real object. For example, the images can be taken according to different points of view or different lighting conditions. And/or, the photographs can be captured with 360° photography, or partially using 360° photography. A captured image of an object can be virtually modified so as to modify the colorimetry of the image, for example. The image then becomes a rendered image.

In the following description, the capture of an image corresponds to the capture of a photograph of a real object, virtually modified or not, or to the generation of an image rendering from a model of a virtual object.

The images are captured according to different parameters, which can be one or several among:
  different points of view, defined by a distance to the object and angles to a reference frame defining a frontal view;
  different conditions of light modifying the lighting of the object in the captured image and/or the reflection of light on the object in the captured image;
  different focal lengths of the optical system used to capture the image;
  different angles of capture of the image; and
  any parameter of image capture modifying the aspect of the object in the captured image.

A database is formed with each image of each object. The different parameters for the capture of the image are chosen independently from the parameters of the virtual environment. Hence, the image generated correspond to an image for which the laws of physics such as perspective, geometry and lighting are respected but which differs from those of the point of view created.

The method 10 comprises a step of incorporation 106 of the first image into at least one location of the environment according the first point of view, wherein the representation of law of perspective on the object in the first image creates an error, discernible to the human eye, relative to the law of perspective applied at the point of view, to provide the computer-generated image presenting an overall perceived photorealism.

The step of incorporation 106 minimizes the error, discernible to the human eye, for example by user attributes of the first image in the database.

With these steps, the method 10 constructs a composite computer-generated image. A composite computer-generated image is a computer-generated-image composed of different images, computer-generated or not.

In preferred embodiments, a point of view of a virtual environment is defined by the percentage of surface in the image representative of the point of view in which objects can be inserted. The inventors have realized that a maximum surface, for each point of view, can comprise errors with regard to the laws of physics, discernible to the human eye, without an average user noticing such errors. The perceived photorealism is maintained.

The limit for the eye resolution is around 0.3 arc-minutes or 0.005°. For example, Blackwell ("Contrast Thresholds of the Human Eye"; Journal of the Optical Society of America Vol. 36, Issue 11, pp. 624-643 (1946); https://doi.org/10.1364/JOSA.36.000624) teaches that the critical visual angle to spot as a non-point source is 0.7 arc-minute. Thus, since two pixels are necessary to carry out a differentiation, this means that the pixels must be of a size of at most 0.35 arc-minute. More recently, Curcio et al. ("Human Photoreceptor Topography"; The Journal of Comparative Neurology 292:497-523 (1990), mentions a value of 77 cycles per degree, or 0.78 arc-minute per cycle or 0.39 arc-minute. Bibliography also says that the level of brightness and the spectral response to color should be taken into consideration to compute the human eye resolution.

In the demonstration below, a value of 0.5°, i.e. 30 arc-minutes, is chosen; it should be noticed that it is already considerably greater that the human eye resolution, since it is indeed two orders of magnitude greater. The skilled person wanting to insert an object with good perspective inside any potential future composite image, would then want to create an image of the object every 0.5°. This means 259 000 different pictures would have to be taken for that purpose; notwithstanding the fact that if the human-eye resolution was considered to be 0.39 arc-minute, the number of pictures would be 10 000 times higher than with 0.5°. Moreover, the process would have to be repeated for every lighting condition and modification of capturing parameters. The number of pictures taken would then be very timewise and storagewise consuming.

The inventors of the present invention have discovered that under certain circumstances and parameters, creating complex composite images can be carried out without the need for taking as many images.

Preferably, the method 10 comprises:
- a step 102 of determining a percentage of a surface of a representation from the point of view in which at least one image of at least one object is inserted,
- a step 103 of computing a number N of images of at least one object to be captured depending on the percentage determined at step 102,
- a step 104 of capturing and/or rendering N images of at least one object,
- during the incorporation step 106, one of the N images is inserted into the first point of view.

During the determination step 102, the percentage can be decided by the creator of the point of view. Preferably, the percentage is lower than twenty percent. Even more preferably, the percentage is between five and fifteen percent. In a preferred embodiment, the percentage is chosen equal to ten percent.

The inventors have realized through test on test subjects, that with a percentage of 10%, an average user perceives photorealism and the space for objects offered is optimized.

In preferred embodiments, the percentage determined is related to:
- the geometrical dimensions of the object;
- the observation point;
- the angle of view;
- the lighting.

For example, the percentage is determined automatically depending on:
- the distance of each location to the virtual camera, or eye, spot from which the point of view is seen;
- the position of the location in the point of view,
- the size of the object,
- the size of the location; and/or
- the lighting of the location.

The percentage determined can be an attribute of the point of view. Hence, for any virtual environment for which the percentage computed is the same, any object for which N or more images have been captured can be represented.

During the computing step 103, the number N of images is computed depending on the percentage. Preferably, the number N is computed proportionally to the percentage determined.

The computing step 103 consists in reducing the number of generated images of an object, to be inserted in any non-predefined virtual environment with the same percentage attribute. In the following example, it is considered that all locations are equidistant from the spot from which the point of view is seen, and that the locations have the same size.

If the aggregated apparent surface S of inserted object images is maintained under a percentage P of the total surface $S_0$ of the resulting composite image, it is possible to keep the number of pre-generated images of any object to insert under a certain value N in order to achieve perspective photorealism.

The description below describes an example of protocol used to find a coefficient K for the relationship between the number of images and the percentage represented by the following mathematical expression:

$$N = K \times P \quad (1)$$

$$\text{Where } P = \frac{S}{S_0} \quad (2)$$

Then a maximum $P_0$ value can be determined. The $P_0$ value is the maximum percentage value for which photorealism is no longer perceiver by the average user. Hence, for every virtual environment this percentage cannot be exceeded when inserting images of objects in locations. $P_0$ is chosen to be twenty percent based on test realized on a panel of average users. And it was also determined by the same panel of users that a number N equal to 300 is sufficient. Hence the coefficient K would be 1500 in such case.

The number N defines a number of sample images that need to be captured for at least one object that will potentially be inserted in future non-yet defined virtual environments for which the percentage attribute is equal to P. That is, the constraint of having no more than P percent of the apparent surface of the computer-generated image of a point of view representing an aggregation of inserted objects in at least one location of the point of view.

Preferably, each capturing or rendering of an image is defined by respective parameter values of:
the geometrical dimensions of the object;
the observation point;
the angle of view;
the lighting,
and for each parameter, the parameter values of the N corresponding images are equally spread within a range.

Hence, for each of the geometrical parameter values, a range is defined by the user. For example, the angle of view can vary all around the object and the observation point can be at a distance varying between 3 meters and 1 meter from the object. And the user can decide, for each range, how many images should be available. For example, two for the lighting and eight for the angle of view. The multiplication by themselves of the numbers of images for each parameter must be at least equal to N.

Then, for each set of geometrical parameters, an image is captured or rendered.

Figure 4:
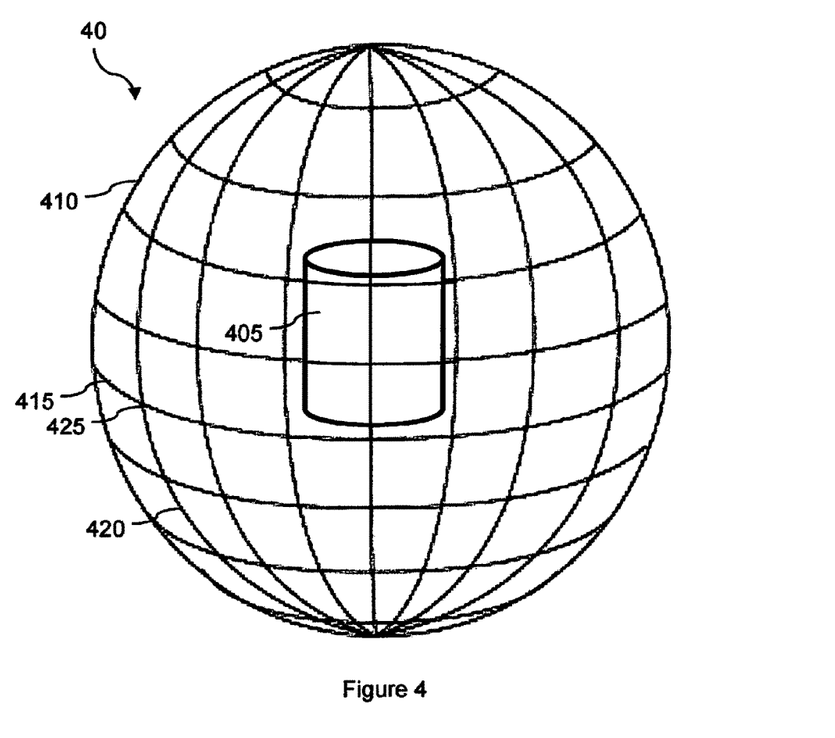
FIG. 4 represents, schematically, an embodiment of a method for capturing images of a virtual or real object

The following description explains an example of capture of N images with reference to FIG. 4.

FIG. 4 represents an object 405 for which pictures are taken. A camera is positioned at a predefined distance from a chosen point of the object, preferably the center of gravity or geometric center of the object. For example, the distance is chosen to be 1.5 meters. To take N images considering that the angle of view is the only geometrical parameter considered, a virtual sphere around the object, for which the predefined distance is the radius and the center is the chosen point, is computed. The sphere is divided in N intersection points representative of intersections between latitude lines and longitude lines.

For example, during the capture of images of an object, an image is captured every 15° around a vertical axis in a horizontal plan at a distance of three meters from the object. Therefore, after a complete rotation around the vertical axis, 24 images have been captured. The same operation is repeated by modifying the angle to the horizontal plan by 15° between every iteration. Hence, the operation has been carried out 12 times. Therefore, 288 images of the object are captured for a given colorimetry and lighting. The number of images captured is far inferior to the teachings of the state of the art with regard to the resolution of the human eye, as was demonstrated above with the result of 259 000 images which was computed with a value far greater than the human eye's resolution.

In particular embodiments, the percentage can represent the apparent surface of the represented object divided by the total surface of the image from of the point of view.

In the following example, a representation of twenty identical objects on a table is to be generated, wherein the total expected apparent surface of the images related to these objects would stand for less than P, itself chosen as equal to twenty percent of the total composite image apparent surface. As indicated above, for P equal to twenty percent, N would be at least equal to 300. The following image capturing protocol could be implemented.

The camera is placed, from an original frontal position:
at a fixed distance of 1.5 meters from the object,
at different heights varying from 1.5 meters above and below the original frontal position, the range would be divided by 15 centimeters steps, such that twenty-one positions are defined,
at an angle of view varying from zero to 360° by 45° steps, such that eight positions are defined, and
under two different lighting sources, a frontal lighting and an overhead lighting in order to annihilate shadow effect on the product.

This protocol leads to the capture of a set of 336 images of the object. The images are then usable for any future point of view respecting the constraints of a maximum of 20 objects taking overall a maximum of 20% of the apparent surface of the environment from the considered point of view.

The captured images are stored in a database with attributes defining the angle of the point of view, the lighting conditions and the height.

The closest possible image from the set is incorporated in a location of the point of view of the virtual environment. The closest possible image can be determined thanks to the attributes or based on an operator's choice. Therefore, an error regarding the laws of perspective of the representation of the object in comparison to the laws of perspective of the point of view is discernible.

The protocol explained above is an exemplary embodiment of the present invention. Other examples can be deducted therefrom.

For example, for inserting larger products at the same distance from the camera, the number of pictures would have to be greater. More particularly, it the object is twice as large as that of the precedent example, a picture would have to be taken every 22.5° and every 7.5 centimeters for the height.

In other embodiments, in order to reach a number N of pictures lower than 200, taking into account the gravity, it is very unlikely that an object will need to be captured from a point of view located under this object, as the object will most likely be placed on a surface of the setting. The number of images to be captured can therefore (with regard to the previous protocol) be divided by two as only views from above (here from zero to 1.5 meters) need to be captured.

In particular embodiments, the method 10 is applied to at least two points of view of the virtual environment, each point of view defining a different setting of the virtual environment, and the method comprises a step of constituting 109 a second computer-generated image for a second point of view defining a second setting, the second setting partially comprising elements of the first setting and said first image of said object.

An image incorporated in a first setting is also incorporated into a second setting when the same image minimizes the error for both points of view, for example.

In particular embodiments, the constituting step 109 comprises:
a step of computing 107 an angular variation of an element common to two settings, and
a step of comparing 108 said angular variation to a predetermined angular variation value.

The predetermined angular value corresponds to the maximum angular difference between the points of view for the capture two different images of an object in a given point of view without disturbing the impression of photorealism at said point of view.

During the constituting step 109, it is considered that the first and second points of view create a viewing angle variation different from 0°. In other terms, some elements of the first and second points of view are common but represented from a different angle and some elements present in the first point of view are absent from the second point of view and conversely.

More precisely about step 107, the angular variation corresponds to the angle between:
- a line from a point on an element in common to the first and second points of view to the source of the first point of view, and
- a line from the same point on the same element in common to the first and second points of view to the source of the second point of view.

The case in which the angle created between the first and second points of view is 0° is considered hereafter in a selection step 111 in which an optical parameter is adapted automatically. An optical parameter is, for example, the scale of the image, the average colorimetry, the average contrast, the average lighting.

The adaptation of the scale of the image is carried out by homothetic transformation, where the homothetic center is the point of observation and the ratio depends on the distance between the point of observation and the representation of the location of the object and on the distance between the camera and the object during the capture 104.

The angular variation is compared in a comparing step 108 to a predetermined angular variation value. If the angular variation is lower than or equal to the predetermined angular variation value, then the image of the object from the second point of view is the same image as the image of the object from the first point of view.

The predetermined angular variation value can depend on the angular variation between two images captured. For example, with an angular variation of capture of 45° in the above capture protocol, the angular variation value can be set to half of this variation, i.e. 22.5°.

The predetermined angular value differs from the resolution of the human eye which is estimated at about 0.3 minutes of arc in the state of the art. The predetermined angular value is about three orders of magnitude greater than the resolution of the human eye. The human eye can detect a flaw; however, the human brain is unable to understand the flaw and therefore perceives photorealism.

The inventors realized that by choosing not to respect the laws of physics and human biology to a certain point, more liberty is made possible with regard to the choice of the image inserted into the virtual environment.

For example, if the predetermined angular value is 45°, for an object located at a computed distance of 3 meters from the source of the point of view, an average user cannot see the distinction between an image, named "perfect image", in conformity with the laws of physics and an image in which the object is at an angle from the perfect image. Preferably, the predetermined angular value is comprised between 15° and 25°.

The inventors also noticed that the predetermined angular value depends on the distance between the source of the point of view and the location of the image of the object. For example, if an object is located at a computed distance of 6 meters from the source of the point of view, the predetermined angular value can be 35°, and preferably 30°.

The inventors noticed that similar conclusions can be reached regarding flaws in colors of shadows between two points of view.

In particular embodiments, the method 10 comprises a step of generating 114 a shadow of the representation of the object in the image inserted into at least one point of view.

A shadow can be computer-generated based on the shape of the representation of the object on the image, and an approximation of the computation of a shadow for different parameters of lighting can be applied. The parameters of lighting can be computed for e.g. five different light sources: a front light, and lights 1.5 meters above and below the object, with angles of 45° to the left and the right.

In preferred embodiment, the shadow is generated according to a predefined projection independent from the virtual environment. The predefined projection can be virtual or real during the capture of the images.

For example, shadows can be pre-rendered and added when an image of an object is incorporated in a point of view and does not exactly correspond to the image of the object and/or parameters of the virtual environment.

A projected shadow follows the laws of optics; the state of the art teaches that a shadow is the shape of the object projected onto the image of the environment. Then, the grey scale of the image is modified. The modification can be carried out by applying methods such as gumming out or by a linear algorithm going from black close to the object, also known as 100% grey, to e.g. 30% grey at the edge of the shadow. Such choices are far from the teachings of the state of the art, as the physical laws for the reflection of light, which causes the greying of shadows, are actually much more complex. Lastly, the blurring effect of the shadows surrounding the object that results from the phenomenon of light refraction is not necessarily be applied, while the skilled person would wish to reproduce this effect as closely as possible.

Another example concerns lighting effects, such as reflections or mirroring effects, which can be rendered on three-dimensional models or on captured images, while preserving photorealism in the obtained computer-generated environment.

Figure 2:
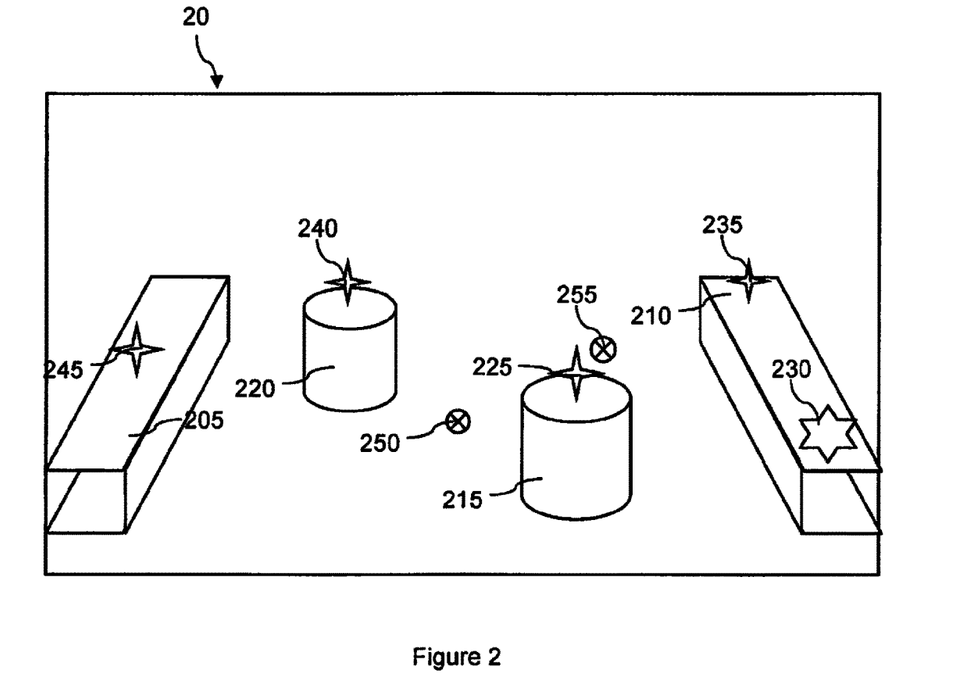
FIG. 2 represents, schematically and from a first observation point, a particular embodiment of the virtual environment that is the subject of the present invention.
Figure 3:
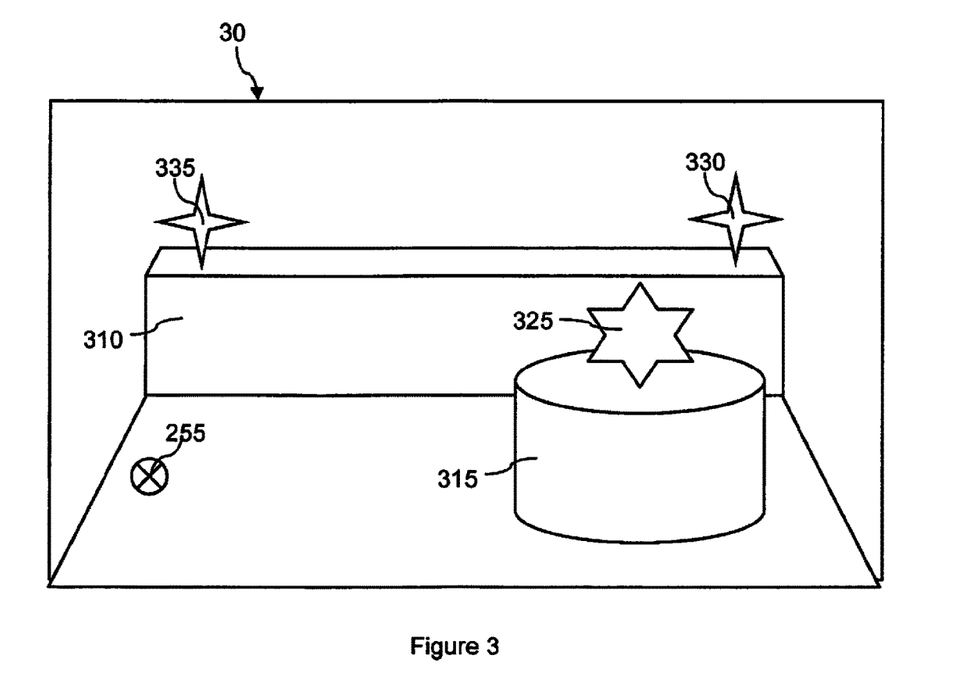
FIG. 3 represents, schematically and from a second observation point, the particular embodiment of the virtual environment that is the subject of the present invention.

In certain embodiments and referring to FIGS. 2 and 3, the method 10 furthermore comprises:
- a step of constituting a computer-generated image of the virtual environment from an initial point of view 250 or 255 by positioning images, 225, 230, 235, 240, 245, 325, 330 and/or 335 of objects in the setting from the initial point of view 250 or 255; and
- during a step of constituting a new computer-generated image 20 or 30 of the virtual environment, from another point of view, automatically positioning (step 112 of FIG. 1) objects 225, 230, 235, 240, 245, 325, 330 and/or 335 in the image depending on its position in at least one already constituted computer-generated image 20 or 30 from point of view 250 of 255.

When the location in the setting from point of view 250 or 255, on which an image of an object has been placed, is visible from another observation point 250 or 255, an image of the same object is positioned on the same representation of the location from the other point of view.

The image of the object positioned is for example the same image as the one in the initial view. The image can then be modified by accessing a user interface (step 113 of FIG. 1).

In certain embodiments, during the step of constituting a computer-generated image 20 or 30 of the virtual shop from a point view, an image, 225, 230, 235, 240, 245, 325, 330 and/or 335 of each object to be positioned is automatically selected depending on the point of view of the image of the object and on a geometric variation between at least one already constituted computer-generated image 20 or 30 from a point of view 250 or 255 and the computer-generated image under construction from another point of view.

The already constituted computer-generated image 20 or 30 from a point of view is used to determine the representation of a location occupied by the object in the view under construction. The angular difference from one view point to another is determined. If the angular difference is lower than a predetermined value depending on image capture parameters and thus on number N, the image for a given object is automatically selected as being the same as the image in the existing view because the difference is imperceptible to the untrained eye. If this angular difference is equal to, or higher than the predetermined value, the image for this object is selected (at step 111) according to the algorithm associated to the category of pairs. The predetermined value decreases as the number N increases.

In certain embodiments, during the selection at step 111 of an image, 225, 230, 235, 240, 245, 325, 330 and/or 335, of an object, the selected image corresponds to the minimum angular error determined at step 110 in comparison with the change of point of view from an already constituted computer-generated image from a point of view.

An angle of change of point of view is determined for a given representation of a location and two different points of view. The angle of change of point of view is the angle between two lines from the representation of a location respectively to each point of view in a plane. The angle of change of point of view can then be compared to an angular movement of the camera between two captured images of an object, for each pair of images, one of the images in the pair being the image already placed. The minimum difference between the angular movement and the angle of change of point of view determines a set of captured images that can be placed.

According to certain embodiments, during the selection at step 111 of an image of an object, the selected image is the same as the image of the object in the already-existing view of the virtual shop. These embodiments are for example when the image corresponds best for the angular minimization.

In certain embodiments, during selection step 111, a user interface is accessed at step 113 to change a parameter of the image capture by scrolling through the captured images.

Step 113 can be carried out when the operator or a test group is not satisfied with the quality of the perceived photorealism. The user interface comprises a step of accessing a database of object images and displaying the captured images of the object.

Preferably, a parameter is the lighting of the object in a captured image.

Preferably, another parameter is the reflection of light on the object in the captured image. Preferably, still another parameter is the focal length of the optical system used for the captured image.

The parameters are stored in the database such that a user can access at step 113, through the user interface, the images sorted by any of the parameters described-above.

According to certain embodiments, the method 10 further comprises a step of replacing 115 an image of an object by an image of another object.

All the images of an object are selected, and the images of another object are automatically positioned in the representations of locations formerly occupied by the first object. Preferably, the images of the object newly occupying the representations of the locations are selected automatically.

In summary the method 10:
  makes it possible to generate an environment independently from the capture of images of an object,
  establishes sufficient quality criteria: the limited number of angles of view around the object, the lighting, the shadows, the single distance of the image capture, the limited resolution, the calibers of the space;
  collects context criteria: the size of the space, the places for inserting objects;
  establishes image capture protocols for real objects: the position of the video cameras in the space, the lighting, focal length, distance, resolution and number of photographs;
  assembles the objects in the space in association with the position of the visitor's eye at the location of the video cameras and the discrete navigation from point-to-point; and
  optimizes emotion.

The method 10 of the invention is implemented by means of a computerized environment including or cooperating with the following components in order to create and add gradually to the databases of objects and environments:
  a means of performing algorithmic computations and having:
    a CAD or image composing software stored in a memory accessible by the microprocessor,
    an incorporation, ingestion and/or merging software for 360° photographs and environment panoramas,
  a database of images of real or virtual objects,
    a design software for immersive navigation in a three-dimensional environment, with the creation of representations of locations where images of objects can be inserted,
    at least one algorithm for classifying and recalling decision rules, more specifically for the determination of algorithms for each category of pair such as artificial intelligence and/or machine learning algorithms,
  at least one algorithm for computing profiles and community recommendations;
  a set of photographic equipment for taking 360° photographs of objects and environments;
  an algorithm for classifying pairs into categories according to their combined physical characteristics, for the purpose of achieving a unique set of decision algorithms to be used for each type by category.
  a database of decision rules, relating to perceived photorealism, applicable to each of the categories.

The categories and decision rules are gradually added to for each new creation of an object and/or environment.

The method 10 of the invention makes it possible to respond to the following criteria of virtual stores. The environment hosting objects for sale must be able to match any space, for example, open or closed, framed or not, regardless of its architectural layout, with a simple or circular staircase, small or large windows, ceiling skylight, indoor water feature, etc.

Any kind of store equipment for receiving and inserting objects, for example bookcases, furniture, floors, ledges and sills, terraces and patios, etc., must be covered. The equipment serving as shelves must be positionable anywhere, at any distance from the observation point, and also regardless of the angle of the support surface in relation to a natural horizontal plane.

The lighting of the room or place must not be restrictive: the light can be natural, artificial, cold, warm, blue, yellow, come from multiple sources, point sources or diffused sources, positioned anywhere in the space, etc. In particular, this requires applying realistic shadows to any object placed in these undefined backgrounds with varied lighting for the reception place, as well as planes of the reception equipment.

Moreover, there is no limit on the type of objects to be inserted into the environment, other than their dimensions and sizes, which must remain compatible with the size of the place where they are inserted in the store in question and the overall dimensions of the objects already inserted into the store.

The method 10 subject of the invention therefore makes it possible to create a virtual store, or environment, in which virtual objects or products can be added or removed at a later time. The invention also relates to a virtual shop of computer-generated images constituted according to the method of the invention.

The virtual store represents an existing place or virtual store. Shops are defined for exhibiting objects. The store can be personalized for each customer.

FIGS. 2 and 3 represent two different computer-generated images from two different points of view of a virtual store. The reference for a given object starts with the hundreds digit 2 in FIGS. 2, and 3 in FIG. 3, the two other digits being identical.

The view 20 represented in FIG. 2 shows a shelf 205 on the left side of the view, on which an image 245 of an object. Two tables, 215, 220, on which two images of different objects 225, 240 are centered, are located in the central region of the view. The table 220 is more distant than the table 215. A shelf 210 is located on the right side of the view. On each of the end regions of the shelf 210, an image of an object respectively 230, 235 is represented. The scale of the image 235 at the furthest end of the shelf 210 from the point of view is adapted to the perspective.

Two points of view 250 and 255 are represented in the view. The observation point for point of view 250 is located at the center of the ground surface of the shop. The observation point for point of view 255 is placed further and to the right of the observation point for point of view 250.

In FIG. 3, the user has been placed at the observation point for the point of view 250. The table 315 is therefore in the right part of view 30 and the observation point for the point of view 255 in the left part of view 30. The shelf 310 extends at the back of the view 30. An image 330 different from the image 230 in the view 20 has been selected to represent the same object. However, for the object represented by images 235, 335, the same image has been selected, at different scales.

Figure 5:
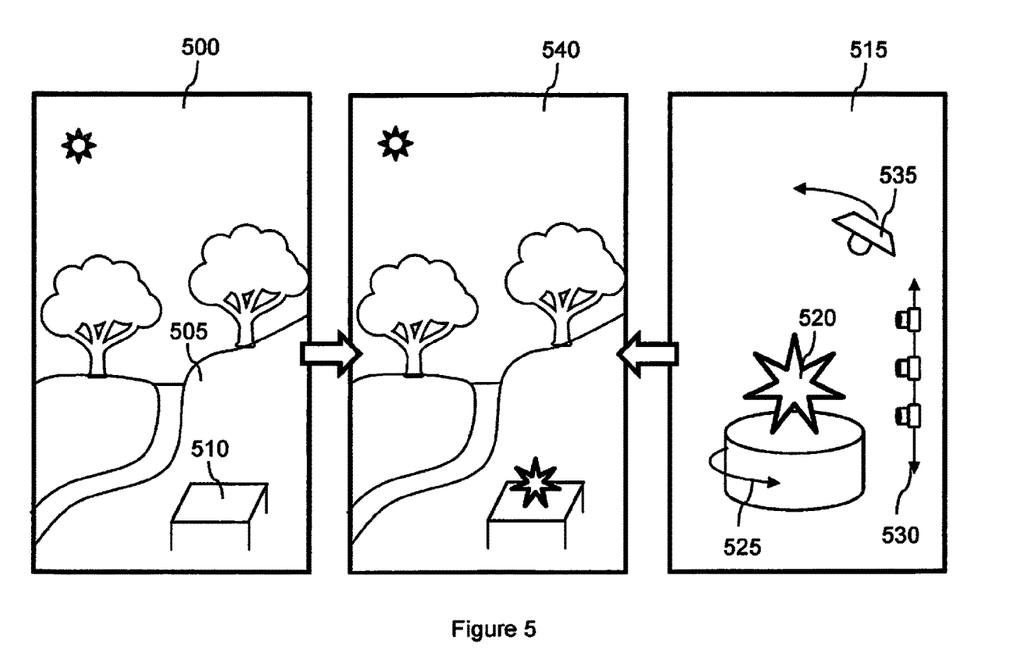
FIG. 5 represents, schematically, an embodiment of a computer-generated image using the method subject of the present invention.

FIG. 5 represents a computer-generated image obtained using the method of the invention. FIG. 5 contains three frames, 500, 515 and 540. Frame 500 represents the result of step 101 of generating a setting from a first point of view by applying the laws of perspective. Frame 515 illustrates the step 105 of generating at least one rendered or captured first image of at least one object, the representation of the object in each image obeying the law of perspective during the generation of the first image. Frame 540 represents the result of the step 106 of incorporating the first image into a location the view, wherein the application of the laws of perspective on the object in the first image creates an error, discernible to the human eye, relative to the laws of perspective applied to the view, to provide the computer-generated image presenting an overall perceived photorealism.

In Frame 500, the virtual environment comprises a setting 505, here representing trees on hills near a riverbed, and a location 510 for insertion of a virtual object, in this example a table in the foreground.

In Frame 515, an object 520 is placed on a table 525. The table 525 can be rotated at least through 180°. A light source 535 is placed above the object, and can also be rotated so as to be placed above the object or in front of the object, hence with a rotation of at least 90°. In certain embodiments, the temperature of the light can be modified. In certain embodiments the rotation of the light source is limited to 45°. In certain embodiments, the light source 535 is fixed and position of the object is oriented relative to the light source.

A camera 530 is located next to the table 525 at a fixed distance, for example 1.5 meters. The camera can be moved up and down and around the object 520, preferably in a circular manner. Preferably, the movement of the camera 530 is of at least 180°.

Images of the object are captured according to different mutual positions of the table 525, the camera 530 and the light source 535 as described in the description of FIG. 4. The images are captured independently from the generated view represented in frame 500.

In frame 540, one of the images captured has been inserted at location 510. The inserted image is the image, among the group of captured images, corresponding the best to the parameters of location 510. In other words, the captured image is merged into the view created.

The invention claimed is:

1. A method of construction of a computer-generated image, the computer-generated image comprising a representation of an environment, called setting image, from a point of view, and at least one location of the setting for insertion of an image of an object, comprising:
   a step of creating a setting image by applying the laws of perspective,
   a step of generating at least one rendered or captured image of at least one object, the representation of the object in each image obeying the laws of perspective during the generation of the object image,
   the generating step being independent from the creating step,
   a step of incorporation of the object image into at least one location of the setting image while allowing an error discernable to the human eye, when, the laws of perspective are applied on the object image, relative to the law of perspective applied at the point of view, whereby the constructed computer-generated image presents an overall perceived photorealism, and whereby the method requires a limited number of images for different points of view.

2. A method according to claim 1, further comprising:
   a step of determining a percentage of a surface of the setting image in which at least one image of at least one object is inserted,
   a step of computing a number N of images of at least one object to capture, N depending on the percentage determined,
   a step of capturing and/or rendering N images of said at least one object,
   during the incorporation step, inserting one of the N images into the setting image.

3. A method according to claim 2, wherein each capturing or rendering of an object image is defined by respective parameter values of one or several among:
   the geometrical dimensions of the object;
   the observation point;
   the angle of view;
   the lighting,
   and for each parameter, the parameter values of the N corresponding object images are distributed within a range.

4. A method according to claim 2, wherein the percentage determined is related to one or several among:
   the geometrical dimensions of the object;
   the observation point;
   the angle of view; and/or
   the lighting.

5. A method according to claim 2, wherein the number N is computed proportionally to the percentage determined.

6. A method according to claim 1, applied to at least two different points of view of the environment, the method comprising the construction of a second computer-generated image for a second point of view, the second setting image created in the construction of the second computer-generated image partially comprising elements of the first setting image created in the construction of the first computer-generated image and said object image.

7. A method according to claim 6, comprising:
a step of measuring an angular variation between an element common to the two setting images, and
a step of comparing said angular variation with a predetermined angular variation value.

8. A method according to claim 6, comprising:
constructing an initial computer-generated image from an initial point of view of the virtual environment by inserting at least one image of an object in the corresponding initial setting image, and
constructing a subsequent computer-generated image from a subsequent point of view, and
automatically inserting an object image positioned in the initial computer-generated image into the setting image created in the construction of the subsequent computer-generated image, depending on its position in the initial computer-generated image.

9. A method according to claim 8, wherein during the construction of the subsequent computer-generated image, an image of each object to be inserted in the corresponding subsequent setting image is selected automatically, depending on a point of view of the image of the object and on a geometric variation between the initial computer-generated image and the subsequent computer-generated image.

10. A method according to claim 9, wherein the automatically selected object image corresponds to the minimum angular error in comparison with the change of point of view from the initial computer-generated image.

11. A method according to claim 10, wherein at least one optical parameter of the automatically selected object image is automatically adapted to the subsequent setting image.

12. A method according to claim 9, wherein the automatic selection of an object image comprises the generation of a user interface for changing at least one optical or geometrical parameter of the object image and/or for scrolling through captured or rendered object images.

13. A method according to claim 1, comprising a step of generating a shadow of the representation of the object in the object image inserted into at least one setting image.

14. A method according to claim 13, wherein the shadow is generated according to a predefined projection that is independent from the virtual environment.

15. A non-transitory computer readable medium storing a computer-generated image constructed according to a method according to claim 1.

16. A system for constructing of a computer-generated image, the computer-generated image comprising a representation of an environment, called setting image, from a point of view, and at least one location of the setting for insertion of an image of an object, the system comprising:
a setting-image generator for creating a setting image by applying the laws of perspective,
an object image generator at least one rendered or captured image of at least one object, the representation of the object in each image obeying the laws of perspective during the generation of the object image,
the setting image generator and the object image generator operating independently from each other,
an incorporation unit for incorporating the object image into at least one location of the setting image while allowing an error discernable to the human eye, when the the laws of perspective are applied on the object image, relative to the law of perspective applied at the point of view, whereby the constructed computer-generated image presents an overall perceived photorealism, and whereby the method requires a limited number of object images for different points of view.

* * * * *